(12) United States Patent
Sala

(10) Patent No.: US 6,749,056 B2
(45) Date of Patent: Jun. 15, 2004

(54) METHOD AND DEVICE FOR RESETTING THE POSITION OF PINS IN TRAYS WITH PINS FOR SUPPORTING OBJECTS, SUCH AS PANELS FOR PRODUCING FURNITURE COMPONENTS, TO BE CLAD INSIDE PRESSES

(75) Inventor: Carlo Sala, Ranica (IT)

(73) Assignee: Italpresse Engineering S.p.A., Bagnatica (IT)

( * ) Notice: Subject to any disclaimer, the term of this patent is extended or adjusted under 35 U.S.C. 154(b) by 95 days.

(21) Appl. No.: 10/270,396

(22) Filed: Oct. 15, 2002

(65) Prior Publication Data
US 2003/0213381 A1 Nov. 20, 2003

(30) Foreign Application Priority Data
May 17, 2002 (IT) ...................................... MI2002A1066

(51) Int. Cl.⁷ .............................................. B65G 25/00
(52) U.S. Cl. ..................... 198/750.14; 425/454; 100/35
(58) Field of Search ................................ 100/214, 207, 100/218, 221, 224, 229 R, 35; 72/420; 198/468.6, 750.14; 425/406, 408, 411, 413, 414, 422, 423, 453, 454

(56) References Cited

U.S. PATENT DOCUMENTS 3,764,243 A * 10/1973 Gambill et al. ................ 425/3
5,522,478 A * 6/1996 Diekwisch .................. 187/273
5,692,584 A * 12/1997 Diekwisch .................. 187/273
5,718,307 A * 2/1998 Diekwisch .................. 187/274
5,820,724 A   10/1998 Diekwisch
2002/0011209 A1 1/2002 Renz et al.

FOREIGN PATENT DOCUMENTS

EP            1 160 074            12/2001

* cited by examiner

Primary Examiner—Allen Ostrager
Assistant Examiner—Shelley Self
(74) Attorney, Agent, or Firm—Guido Modiano; Albert Josif; Daniel O'Byrne

(57) ABSTRACT

Method and device for resetting the position of pins in trays with pins for supporting objects to be clad inside presses, comprising a tray arranged on a substantially horizontal plane and in which there are multiple receptacles having a substantially vertical axis, each receptacle accommodating a pin provided with a head protruding from the upper face of the tray. The pins form with their heads a supporting surface for the lower face of the object to be placed in the press. Each pin has elastic means that keep the pin in a raised position and are flexible so as to allow the pin to pass from the raised position to a lowered position or vice versa. The method consists in making the tray slide along a resetting surface having, along its extension, a region raised with respect to a plane that is parallel to the plane of arrangement of the tray. The raised region is suitable to gradually make contact with the lower end of the pins in the lowered position, as they pass at the raised region, to produce their transfer to the raised position.

11 Claims, 4 Drawing Sheets

METHOD AND DEVICE FOR RESETTING THE POSITION OF PINS IN TRAYS WITH PINS FOR SUPPORTING OBJECTS, SUCH AS PANELS FOR PRODUCING FURNITURE COMPONENTS, TO BE CLAD INSIDE PRESSES

BACKGROUND OF THE INVENTION

The present invention relates to a method and a device for resetting the position of pins in trays with pins for supporting objects, particularly objects such as panels for producing furniture components or the like, to be clad inside presses.

As is known, the cladding of panels, particularly panels for manufacturing furniture components, by means of a thin sheet made of synthetic material, veneering or the like, is generally performed by heating the cladding sheet and making it adhere to the panel inside a press.

In many cases, the thin sheet must clad one of the larger faces of the panel and the lateral faces that are adjacent to such larger face.

Due to this requirement, the panels to be clad are generally fed to the press by depositing them on a tray that supports the panel by virtue of a plurality of pins. More particularly, the panel is rested on the tray on a substantially horizontal plane and is supported by multiple pins that have a substantially vertical axis and make contact with the lower face of the panel, which is one of the two larger faces of the panel and lies opposite the face that is meant to be clad together with the lateral faces.

In order to allow the cladding sheet to cover the lateral faces completely, generally the pins of the tray can be arranged in two positions: a raised position, in which they make contact with the lower face of the panel, and a lowered position, in which they are spaced below the lower face of the panel, which is supported by the pins that are instead in the raised position. The pins that are fully covered by the panel are moved to the raised position, manually or mechanically or kept in the raised position before or after depositing the panel on the tray, while the pins that are meant to be covered only partially or not covered by the panel are moved to the lowered position or kept thereat. In this manner, the panel rests on the pins in the raised position with its lower face, except for a region that is proximate to the edge of the panel, so that the thin sheet, as a consequence of the pressure applied by the press, optionally with the aid of suction applied to the lower face of the thin sheet, can adhere to the upper face and to the lateral faces of the panel.

A tray of this kind is disclosed EPA 01111247.1, by the same Applicant, which is assumed included herein as reference.

The tray disclosed in the above patent application is arranged on a substantially horizontal plane and is used to insert and extract the panels to be clad in the press. More particularly, the tray has multiple receptacles that have a substantially vertical axis; each receptacle accommodates a pin that is provided with a head that protrudes from the upper face of the tray. All together, the pins form, by way of their heads, a supporting surface for the lower face of the panel to be clad. The pins can move individually on command, along the axis of the corresponding receptacle, in order to pass from the raised position, in which they are suitable to make contact with the panel and support it, to a lowered position, in which they are spaced below the panel. For each pin there are elastic means that cooperate with the pin and the corresponding receptacle so as to retain the pin in the raised position. The elastic means are flexible in order to allow the corresponding pin to pass from the raised position to the lowered position or vice versa.

When it is necessary to pass from the cladding of one type of panel to another type of panel that is different in terms of dimensions and/or shape, it is necessary to perform a so-called "reset" of the position of the pins in the previously used tray. The resetting operation substantially consists in moving all the pins to the lower position or to the raised position, so as to be then able to move into the raised position, or keep thereat, only the pins whose head is meant to be covered completely by the new panel to be clad.

In the patent application cited above, among the various possibilities for resetting the position of the pins that are considered, a resetting is described which is performed by lifting the pins that had been lowered during the preceding process. The same patent application considers the possibility of performing this operation by lowering the tray onto a substantially horizontal abutment surface that is arranged in a downward region and can also be constituted by the lower platen of the press, so that during this downward motion the lower end of the pins rests against the surface and accordingly all the pins that are in the lowered position are moved to the raised position.

The transfer of the pins from the lowered position to the raised position is contrasted, particularly in the final portion of the upward movement, by the elastic means provided for each pin, which are meant to subsequently keep the pin in the raised position.

Owing to the large number of pins that are usually present in trays of this kind, the sum of the elastic reactions of the elastic means for each pin can be so large as to cause an upward deformation of the tray.

Currently, in order to avoid the deformation of the tray, during the resetting of the position of the pins an appropriately provided panel is arranged above the tray; such panel is provided with blades that by fitting between the pins contrast the lifting of the part of the tray in which the receptacles for the pins are formed. However, this remedy has the drawback that it increases the time required to reset the position of the pins, since it requires to load the panel with the blades onto the tray and then unload it.

Actually, there are other resetting systems that are based on an individual or grouped action on the pins, but these systems are generally complicated, since they use actuators of the mechanical or pneumatic type that have considerable costs and are complicated to actuate.

SUMMARY OF THE INVENTION

The aim of the present invention is to solve the above described problem, by providing a method and a device for resetting the position of pins in trays with pins for supporting objects, particularly objects such as panels for producing furniture components or the like, to be clad inside presses, that allows to reset the position of the pins very simply and rapidly, avoiding deformations of the tray.

Within this aim, an object of the invention is to provide a method and a device that allow to reset the position of the pins without requiring the use of auxiliary devices to contrast the deformation of the tray.

Another object of the invention is to provide a device for resetting the position of the pins that does not complicate substantially the press and the devices for moving the tray.

This aim and these and other objects that will become better apparent hereinafter are achieved by a method for resetting the position of pins in trays with pins for supporting objects, particularly objects such as panels for producing furniture components or the like, to be clad inside presses, of the type that comprises a tray that is arranged on a substantially horizontal plane and in which there are multiple receptacles that have a substantially vertical axis, each receptacle accommodating a pin provided with a head that protrudes from the upper face of said tray; said pins forming all together, with their heads, a supporting surface for the lower face of an object to be placed in the press; said pins being individually movable on command along the axis of the corresponding receptacle in order to pass from a raised position, in which they are suitable to make contact with said object and support it, to a lowered position, in which they are spaced downward from the object supported by the pins in the raised position, each pin having elastic means that are suitable to keep the pin in the raised position and are flexible so as to allow the pin to pass from the raised position to the lowered position or vice versa, characterized in that it comprises the step of making said tray slide along a resetting surface that has, along its extension, a region that is raised with respect to a plane that is parallel to the plane of arrangement of said tray, said raised region being suitable to gradually make contact with the lower end of the pins in the lowered position, as they pass at said raised region, in order to produce their transfer to the raised position.

BRIEF DESCRIPTION OF THE DRAWINGS

Further characteristics and advantages will become better apparent from the description of a preferred but not exclusive embodiment of the method and the device according to the invention, illustrated only by way of non-limitative example in the accompanying drawings, wherein.

DESCRIPTION OF THE PREFERRED EMBODIMENTS

Figure 1:
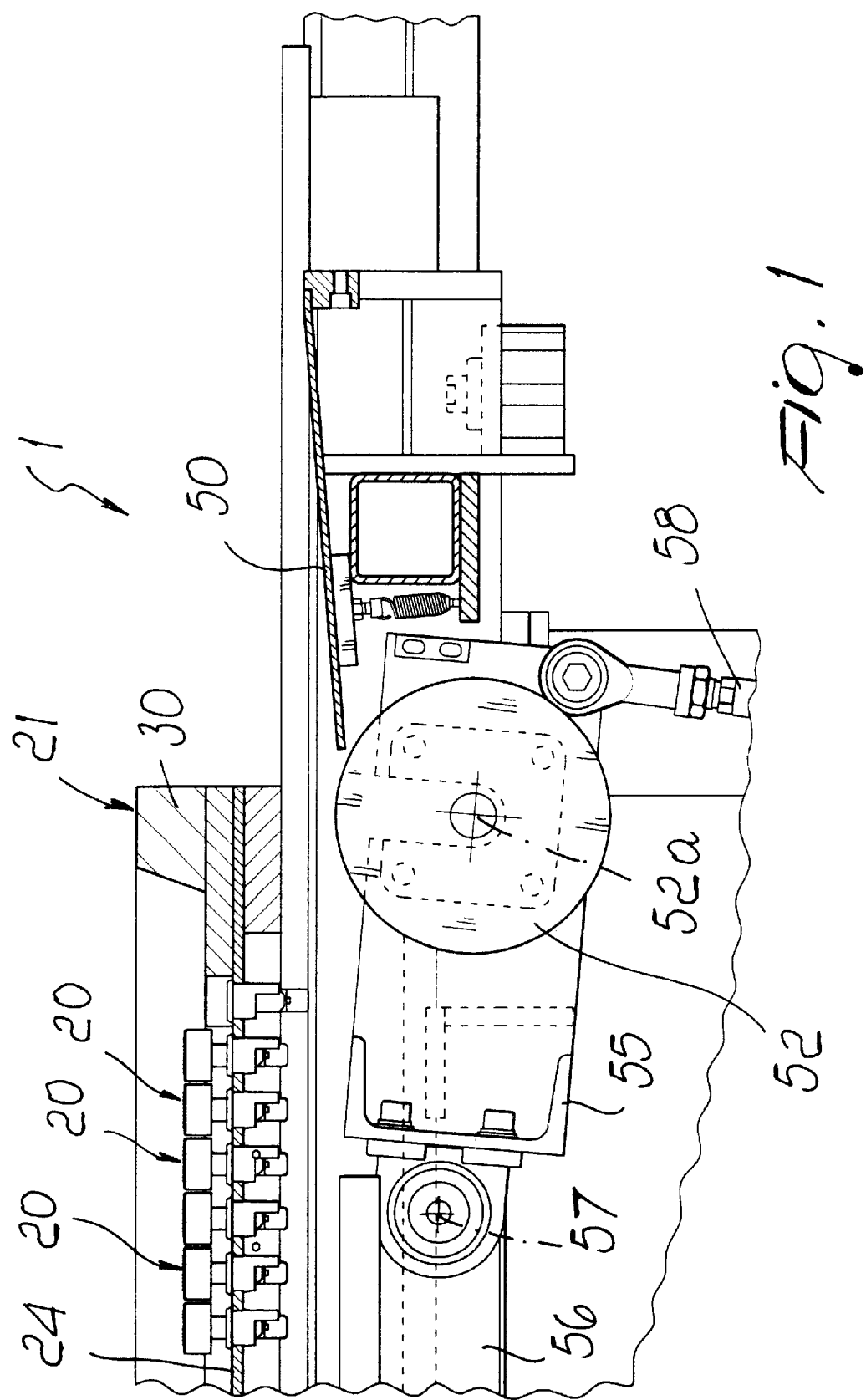
FIG. 1 is a schematic view of a portion of a press with a resetting surface in an inactive position.

With reference to the figures, the device according to the invention, generally designated by the reference numeral 1, is meant to be used to reset the position of pins 20 supported by a tray 21.

More particularly, the device according to the invention is meant to be used to reset the position of the pins 20 in trays 21 of the type disclosed in the cited EPA 01111247.1.

As described in the above patent application, the tray 21 is arranged on a horizontal plane and has a plurality of receptacles 22 that have a substantially vertical axis; each receptacle accommodates a pin 20, which is provided with a head 23 that protrudes from the upper face of the tray 21.

The pins 20 form all together, with their heads 23, a substantially horizontal supporting surface for the lower face of the object to be supported and fed to a press, of a known type, that is shown only partially in the figures. The pins 20 can move individually on command along the axis of the corresponding receptacle 22 in order to pass from a raised position, in which they are suitable to make contact with the object to be clad and support it, to a lowered position, in which they are spaced below the object to be clad.

For each pin 20 there are elastic means that cooperate with the corresponding pin 20 and the corresponding receptacle 22 so as to retain the pin 20 in the raised position. The elastic means are flexible, so as to allow the corresponding pin 20 to pass from a raised position to a lowered position or vice versa.

The elastic means are provided so as to act in the final portion of the upward motion and in the initial portion of the downward motion of the corresponding pin 20.

The tray 21 is composed of a plate 24 that is arranged on a substantially horizontal plane and is surrounded by a raised rim 30.

In the plate 24 there are multiple holes 31 that have a substantially vertical axis and in which bushes 32 are locked; the receptacles 22 are formed inside the bushes.

Each pin 20 has the head 23 that protrudes upward from the receptacle 22, a stem 25 that has a smaller diameter than the head 23 and is accommodated so that it can slide along its axis in the corresponding receptacle 22, and a foot 26 that protrudes downward from the receptacle 22.

The elastic means comprise at least one wing 35a and 35b that is associated with the stem 25 of the pin 20 and can engage at least one abutment 36a and 36b provided on the lateral walls of the corresponding receptacle 22.

Preferably, the head 23 and the stem 25 are formed monolithically, preferably by using molded synthetic material, and the wing 35a and 35b is constituted by a portion of the stem 25 that is elastically flexible toward and away from the axis of the stem 25 in order to move beyond the abutment 36a and 36b when the pin passes from the raised position to the lowered position or vice versa.

The wing 35a and 35b is connected to the remaining part of the stem 25 proximate to its upper end and has, proximate to its lower end, a tooth 37a and 37b that in inactive conditions, i.e., when the wing 35a and 35b is not affected by forces, protrudes from the lateral surface of the stem 25.

The abutment 36a and 36b is formed by a narrower region of the receptacle 22 at a portion thereof that faces the wing 35a and 35b. The narrower region is constituted by a tooth provided on the lateral surface of the receptacle 22.

Preferably, instead of a single wing there are two wings 35a and 35b that are arranged in two mutually diametrically opposite regions of the stem 25 and can flex toward or away from each other.

Correspondingly, inside the receptacle 22 there are two abutments 36a and 36b that are arranged in two mutually diametrically opposite regions on the lateral surface of the receptacle 22 and are meant to be engaged by the teeth 37a and 37b of the wings 35a and 35b.

The receptacle 22 and the stem 25 have a substantially cylindrical shape, preferably with a noncircular cross-section, to prevent the possibility of rotation of the pins 20 about their axis with respect to the receptacle 22.

The bush 31 is also preferably made of molded synthetic material and has, proximate to its upper end, a protruding edge 38 that is meant to rest on the upper face of the plate 24 of the tray 21 when the bush 32 is inserted in the corresponding hole 31.

On the lateral surface of the bush 32, in a region that is spaced downward from the edge 38, there are two elastically flexible wings 39a and 39b, which in the inactive condition, i.e., in the condition in which they are not affected by forces, protrude from the lateral surface of the bush 32 and can flex elastically toward the axis of the bush 32 in order to pass through the hole 31 and engage with a snap action, following their elastic reaction, the lower face of the plate 24, thus locking axially the bush 32 in the corresponding hole 31 of the tray 21.

The pin 20 preferably has a variable useful length, since the foot 26 is articulated about a substantially horizontal axis 40 with respect to the stem 25.

The foot 26 can rotate about the pivoting axis 40 with respect to the stem 25 in order to vary the useful axial length of the pin 20 from a pin extension position, in which the foot 26 is aligned with the stem 25, to a pin shortening position, in which the foot 26 is arranged laterally, preferably at right angles, with respect to the stem 25.

The pin 20 is meant to rest, with its foot 26, in the pin shortening position if the pin is in the lowered position or in the pin extension position if the pin is in the raised position, on the lower platen 41 of the press, as will become apparent hereinafter.

The pin 20 can be provided, in a manner similar to the one described in the cited patent application, with means for contrasting the rotation of the foot 26 about the pivoting axis 40 with respect to the stem 25 when the pin is in the raised position.

Conveniently, the bush 32 has locking means, constituted by a lateral extension 32a that allows the rotation of the foot 26 about the axis 40 with respect to the stem 25 only in one direction.

The pins 20 are arranged, in the plate 24, so that they are aligned in two mutually perpendicular directions that are parallel and perpendicular to the direction of the movement of the tray 21 in performing its insertion or extraction with respect to the press.

Reference is made to the cited patent application for other details related to the pin 20 and to the tray 21.

The device according to the invention comprises a resetting surface 50 that has, along its extension, a region 51 that is raised with respect to a plane that is parallel to the plane of arrangement of the tray 21. This raised region is suitable to gradually make contact, upon the sliding of the tray 21 on the resetting surface 50, with the lower end of the pins 20 that lie in the lowered position, as they pass at the raised region 51, so as to cause their transfer to the raised position.

It should be noted that the raised region 51 can be formed by an arrangement of the resetting surface 50 along a plane that is inclined with respect to the plane of arrangement of the tray 21.

The raised region 51 lies transversely to the direction of the sliding of the tray 21 on the resetting surface 50.

Preferably, the top of the raised region 51 is constituted by a roller 52 that is supported, so that it can rotate about its own axis 52a, by the resetting surface 50 or by a structure for supporting the resetting surface 50 and is orientated so that its axis 52a is substantially perpendicular to the sliding direction indicated by the arrow 53.

Although it may also be positioned in another region, the resetting surface 50 is preferably arranged laterally to the press.

Conveniently, the resetting surface 50 is supported by a structure 55 that is pivoted to a supporting structure 56 about an axis 57 that is substantially horizontal and is also orientated at right angles to the sliding direction 53. The resetting surface 50 can rotate on command, for example by virtue of an actuator of the mechanical or pneumatic type 58 shown only partially in FIGS. 1 and 2, about the axis 57 with respect to the supporting structure 56 in order to pass from an active position, in which it is inclined upward in the opposite direction with respect to the press, to an inactive position, in which it is arranged along a horizontal plane or is inclined upward in the direction of the press.

The method for resetting the position of the pins according to the invention is as follows.

In its simplest embodiment, the method according to the invention consists substantially, starting from a condition in which some of the pins 20 are in the raised position and the remaining pins 20 are in the lowered position, in making the tray 21 slide along the resetting surface 50 in the active position, after lifting the tray 21 so that the foot 26 of the pins 20 that lie in the lowered position has moved into alignment with the stem 25. The foot 26 of the pins 20 that are in the lowered position rests on the resetting surface 50, and the raised region 51 of the resetting surface 50, as a consequence of the advancement of the tray 21 along the sliding direction 53, causes the gradual lifting of the pins 20 as they pass at the raised region 51. As a consequence of this fact, the pins 20 that were in the lowered position are moved into the raised position. It should be noted that the raised region 51 of the resetting surface 50 acts in each instance on a row of pins 20 that is arranged transversely to the sliding direction 53 or in any case on a limited set of pins 20, so that the overall force discharged onto the plate 24 of the tray 21 is such that it causes no danger of deformations or damage of the plate 24.

Preferably, before performing the sliding of the tray 21 along the resetting surface 50, a preparation step is performed during which the tray 21 is raised above an abutment surface that faces the foot 26 of the pins 20, in order to allow the feet 26 of the pins to arrange themselves in the extension position, and is then lowered against the abutment surface, so as to partially lift the pins 20 into an intermediate lifting position that lies between the lower position and the raised position and in which the rotation of the foot 26 of the pins about the pivoting axis 40 with respect to the stem 25 is prevented.

The extent of the partial lifting is such that the elastic means are not substantially affected by forces and therefore the plate 24 is practically not affected by forces. This preparation step is preferably performed in the press by using the lower platen 41 of the press as an abutment surface.

Merely by way of example, a preferred but not exclusive resetting sequence according to the method of the present invention is now described.

Figure 3:
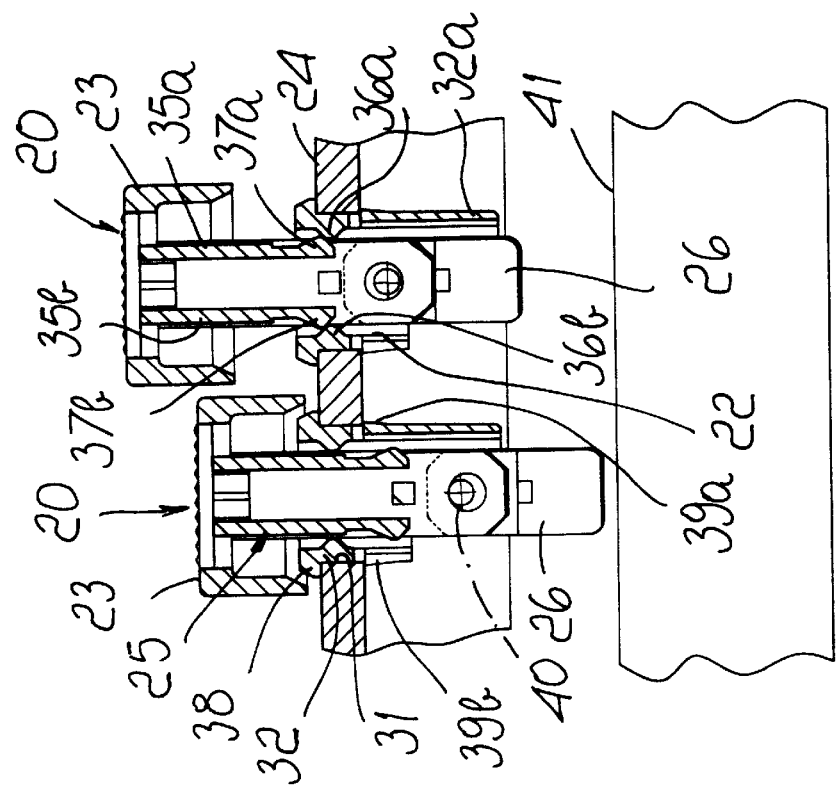
FIGS. 3 to 6 are schematic views of the method for resetting the position of the pins according to the invention.
Figure 4:
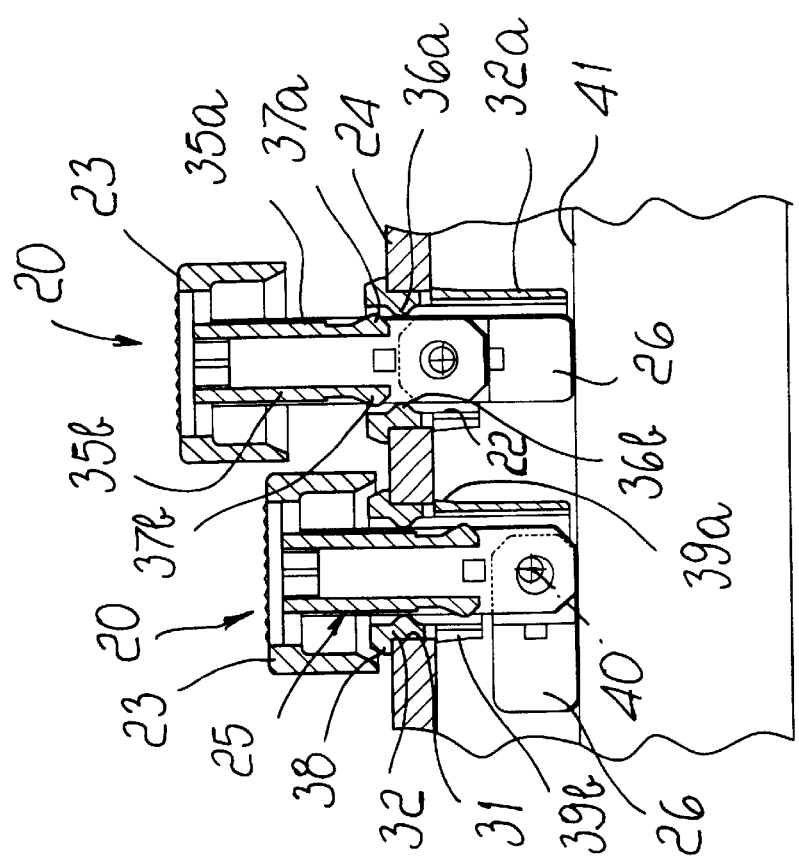
Figure 5:
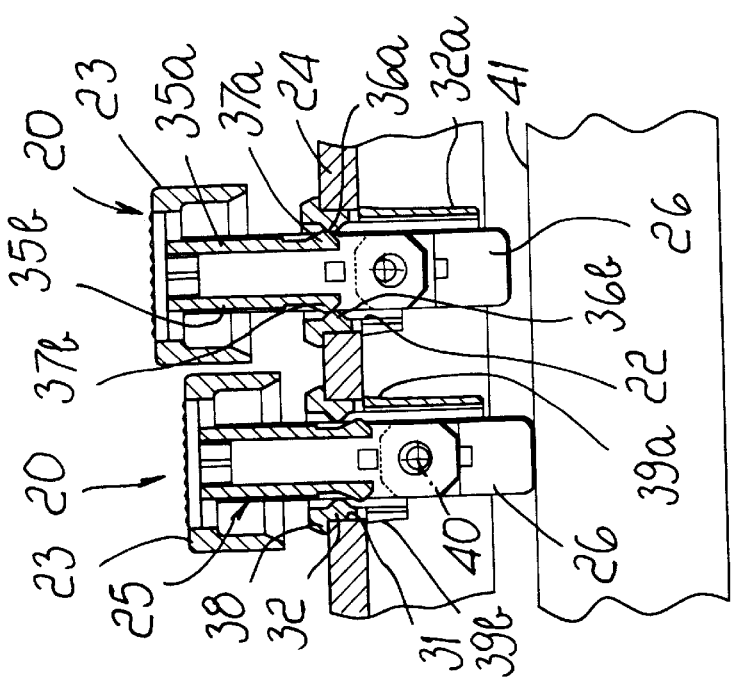

After the panel, or clad object in general, has been removed from the tray 21, the tray 21 is inserted in the press in the open position again, as shown in FIG. 3. The tray 21 is then lifted with respect to the lower platen 41 of the press so as to allow the foot 26 of the pins 20 that lie in the lowered position to arrange itself vertically, i.e., in alignment with the stem 25, as shown in FIG. 4. The tray 21 is then lowered so as to make the foot 26 of the pins 20 that are in the lowered position rest against the lower platen 41 of the press until the pins are partially lifted, as shown in FIG. 5. It should be noted that the extent of the descent of the tray 21 on the lower platen 41 of the press is such that the teeth 37a and 37b remain under the abutments 36a and 36b. In the manner, the wings 35a and 35b are not subjected to excessive forces and therefore the total force transmitted to the plate 24 of the tray 21 is modest and in any case is such that it practically produces no deformation thereof.

Figure 2:
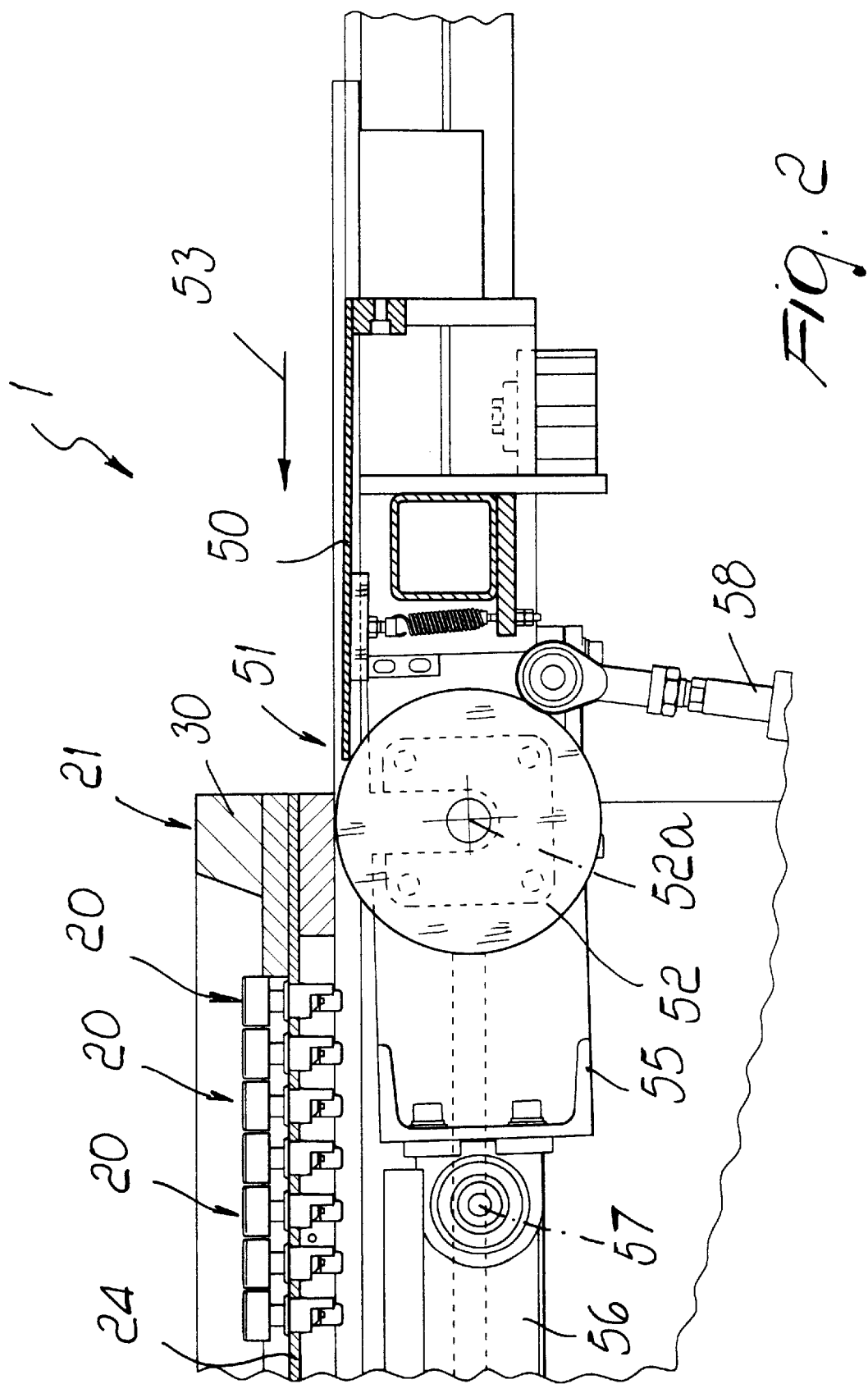
FIG. 2 is a view, similar to FIG. 1, of a portion of the press with the resetting surface in the active position.

At this point the resetting surface 50 is moved into the active position, as shown in FIG. 2, and the tray 21 is extracted from the press by making it slide in the direction 53 on the resetting surface 50.

Figure 6:
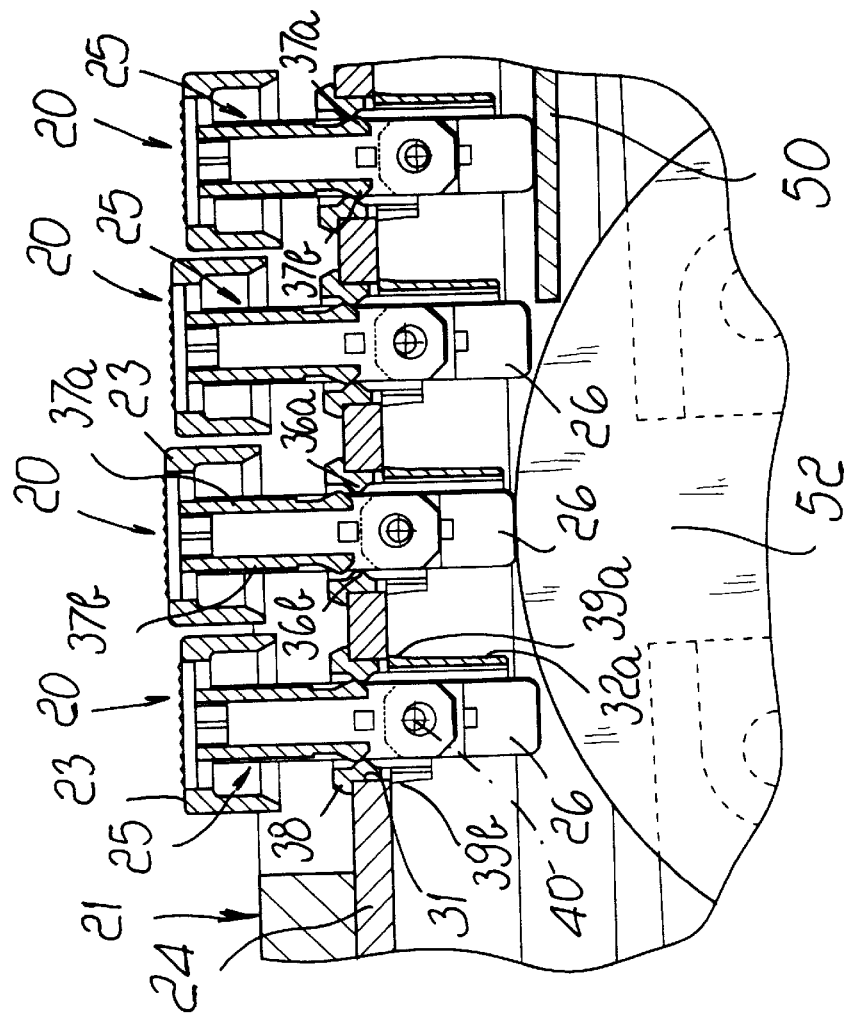

During the sliding, the inclined arrangement of the resetting surface 50 and the roller 52 that is at the top of the raised region 51 cause the further lifting of the pins 20 until the teeth 37a and 37b of the wings 35a and 35b are placed above the abutments 36a and 36b as shown in FIG. 6.

Once the teeth 37a and 37b have moved above the abutments 36a and 36b, the wings 35a and 35b, by elastic reaction, move mutually apart, keeping the pins 20 stably in the raised position.

At this point the tray 21 has all its pins 20 in the raised position and is ready to be used to support a new object, particularly a panel, which is rested on the heads 23 of the pins 20 before or after the lowering of the pins that are not fully covered by the object.

The resetting surface 50 is then moved into the inactive position, in which it can be used as a guide for the sliding of the tray 21 during its insertion in the press.

Although the device and the method according to the invention have been conceived in particular to reset the position of pins of the type disclosed EPA 01111247.1, which have a variable useful length, it can nonetheless be used advantageously to reset the position of fixed-length pins, again of the type described in the cited patent application, or to reset the position of similar pins.

In practice it has been found that the method and the device according to the invention fully achieve the intended aim and objects, since by causing in each instance the passage of a limited set of the pins from the lowered position to the raised position they avoid the application of excessive force to the plate of the tray that bears the pins and therefore avoid deforming it without requiring the use of auxiliary devices to contrast said deformation.

Further advantages of the device according to the invention are that it is structurally simple, inexpensive, easy to apply to currently commercially available presses, and highly reliable in operation.

The method and the device thus conceived are susceptible of numerous modifications and variations, all of which are within the scope of the appended claims; all the details may further be replaced with other technically equivalent elements.

In practice, the materials used, as well as the dimensions, may be any according to requirements and to the state of the art.

The disclosures in Italian Patent Application No. MI2002A001066 from which this application claims priority are incorporated herein by reference.

What is claimed is:

1. A method for resetting the position of pins in trays with pins for supporting objects, such as panels for producing furniture components, to be clad inside presses, of the type that comprises a tray that is arranged on a substantially horizontal plane and in which there are multiple receptacles that have a substantially vertical axis, each receptacle accommodating a pin provided with a head that protrudes from an upper face of said tray; said pins forming all together, with their heads, a supporting surface for a lower face of an object to be placed in the press; said pins being individually movable on command along the axis of the corresponding receptacle in order to pass from a raised position, in which they are suitable to make contact with said object and support it, to a lowered position, in which they are spaced downward from the object supported by the pins in the raised position, each pin having elastic means that are suitable to keep the pin in the raised position and are flexible so as to allow the pin to pass from the raised position to the lowered position or vice versa, comprising the step of making said tray slide along a resetting surface that has, along an extension thereof, a region that is raised with respect to a plane that is parallel to a plane of arrangement of said tray, said raised region being suitable to gradually make contact with a lower end of the pins in the lowered position, as they pass at said raised region, in order to produce transfer of said pins to the raised position.

2. The method according to claim 1, wherein said pins are arranged in rows that are orientated transversely to the direction of the sliding of said tray with respect to said resetting surface, said raised region also protruding transversely to said sliding direction in order to make contact, when said tray slides on said resetting surface, in each instance, simultaneously with the lower end of the pins in the lowered position arranged along a same row of pins that is orientated transversely to said sliding direction.

3. The method according to claim 1, wherein each one of said pins has a head that protrudes upward from the corresponding receptacle, a stem that has a smaller diameter than said head and is accommodated so that it can slide along the axis of the corresponding receptacle, and a foot that protrudes downward from said receptacle; said foot being hinged to said stem about a horizontal pivoting axis that is orientated transversely to said sliding direction and being able to rotate with respect to said stem about said pivoting axis, in order to vary a useful length of the pin, from a pin extension position, in which the foot is aligned with the stem of the pin, to a pin shortening position, in which the foot is rotated laterally to said pin, further comprising before the sliding of said tray along said resetting surface, a preparation step in which the tray is lifted above an abutment plane that faces the foot of the pins in order to allow the feet of the pins to arrange themselves in said extension position and is then lowered against said abutment plane in order to produce a partial lifting of the pins from the lowered position to an intermediate raised position that lies between said lowered position and said raised position and in which the rotation of said foot of the pins about said pivoting axis with respect to said stem is not allowed.

4. The method according to claim 1, wherein said elastic means intervene only in the final portion of the upward movement or in the initial portion of the upward movement of the corresponding pin, characterized in that the extent of said partial lifting is such that it substantially does not apply forces to said elastic means.

5. The method according to claim 3, wherein said preparation step is performed in the press by using the lower platen of the press as abutment plane.

6. A device for resetting the position of pins in trays with pins for supporting objects, such as panels for producing furniture components, to be clad inside presses, of the type that comprises a tray that is arranged on a substantially horizontal plane and in which there are multiple receptacles that have a substantially vertical axis, each receptacle accommodating a pin provided with a head that protrudes from an upper face of said tray; said pins forming all together, with their heads, a supporting surface for a lower face of an object to be placed in the press; said pins being individually movable on command along the axis of the corresponding receptacle in order to pass from a raised position, in which they are suitable to make contact with said object and support it, to a lowered position, in which they are spaced downward from the object supported by the pins in the raised position, each pin having elastic means that are suitable to keep the pin in the raised position and are flexible so as to allow the pin to pass from the raised position to the lowered position or vice versa, further comprising a resetting surface that has, along an extension thereof, a region that is raised with respect to a plane that is parallel to a plane of arrangement of said tray, said raised region being suitable to gradually make contact with a lower end of the pins in the lowered position when said tray slides on said resetting surface, as said pins pass at said raised region, in order to produce transfer of said pins to the raised position.

7. The device according to claim 6, wherein said raised region is formed by an arrangement of said resetting surface along a plane that is inclined with respect to the plane of arrangement of said tray.

8. The device according to claim 6, wherein a top region of said raised portion is constituted by a roller that is supported so that it can rotate about its own axis by said resetting surface and is orientated so as to be substantially parallel to said sliding direction.

9. The device according to claim 6, wherein said resetting surface is arranged laterally to the press.

10. The device according to claim 6, wherein said resetting surface is pivoted by means of one of portions thereof to a supporting structure and can rotate on command about its own pivoting axis with respect to said supporting structure in order to pass from an active position, in which said resetting surface is inclined upward in the opposite direction with respect to the press, to an inactive position, in which said resetting surface is arranged substantially horizontally or is inclined upward toward the press.

11. The device according to claim 6, wherein each one of said pins has: a stem that has a smaller diameter than said head and is accommodated so that it can slide along the axis of the corresponding receptacle, and a foot that protrudes downward from said receptacle, said foot being pivoted to said stem about a horizontal pivoting axis that is orientated transversely to said sliding direction and being able to rotate with respect to said stem about said pivoting axis in order to vary the useful length of the pin from a pin extension position, in which the foot is aligned with the stem of the pin, to a pin shortening position, in which the foot is rotated laterally to said pin, further comprising locking means that are suitable to prevent the rotation of said foot about said pivoting axis with respect to said stem in one direction of rotation at least during the sliding of the tray above said resetting surface.

* * * * *